May 27, 1930.  G. E. GIFT  1,760,592
HOLDING DEVICE FOR FISHING POLES OR RODS
Filed Dec. 27, 1927  2 Sheets-Sheet 1

INVENTOR.
GLEN E. GIFT,
BY Jerry A Mathews
ATTORNEY.

May 27, 1930.　　　　　G. E. GIFT　　　　　1,760,592

HOLDING DEVICE FOR FISHING POLES OR RODS

Filed Dec. 27, 1927　　　2 Sheets-Sheet 2

INVENTOR.
GLEN E. GIFT,
BY
ATTORNEY.

Patented May 27, 1930

1,760,592

UNITED STATES PATENT OFFICE

GLEN E. GIFT, OF FAIRMOUNT, INDIANA

HOLDING DEVICE FOR FISHING POLES OR RODS

Application filed December 27, 1927. Serial No. 242,757.

My invention relates to a holding device for fishing rods, or poles, while not necessarily restricted to this use.

In accordance with my invention, I provide a holding device adapted to receive the fishing rod or pole and to securely support the same, at the usual angle or position, suitable for fishing. When the fisherman desires to raise or manipulate the pole, it may be quickly and conveniently raised or released from the device, the releasing action being entirely automatic. The socket included in the holding device is preferably rotatable, and hence the device has a large range of adjustment. The device may be secured to relatively stationary objects, such as the parts of a boat or may be anchored in the ground. The device is of simple construction and may be manufactured cheaply.

Figure 1:
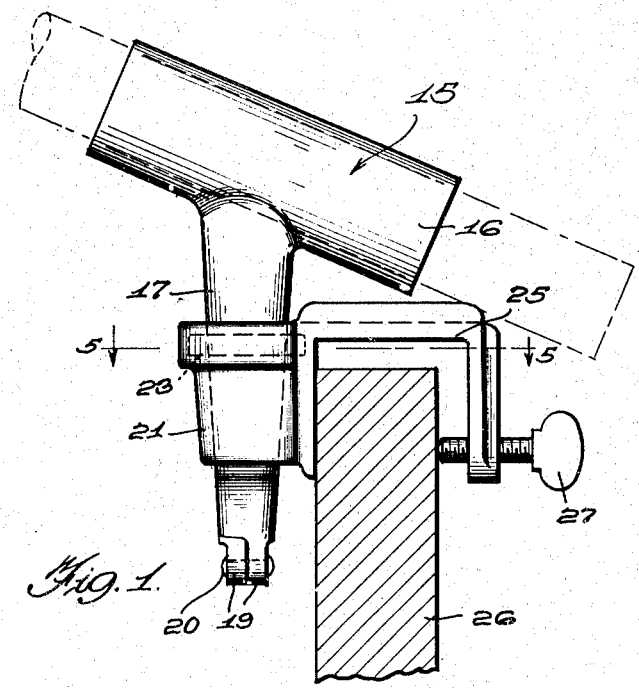
Figure 2:
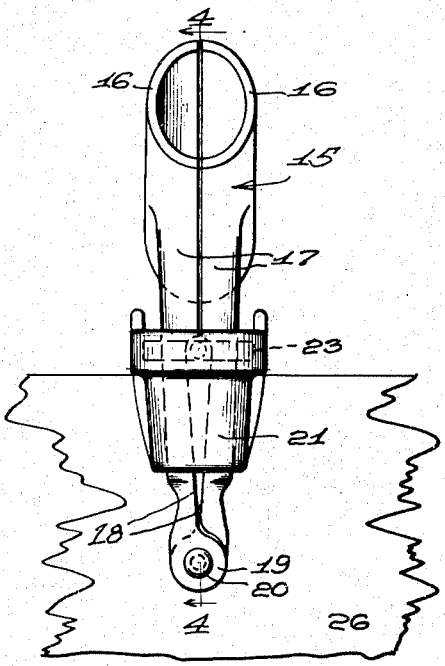
Figure 5:
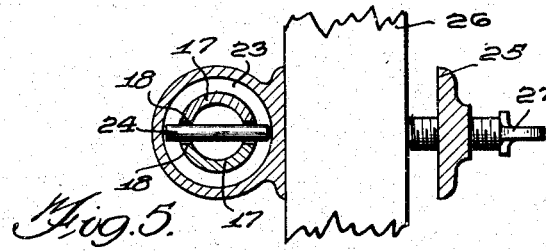
Figure 3:
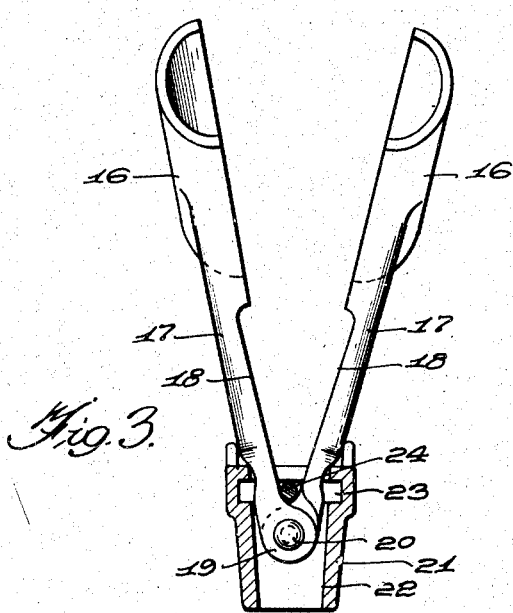
Figure 4:
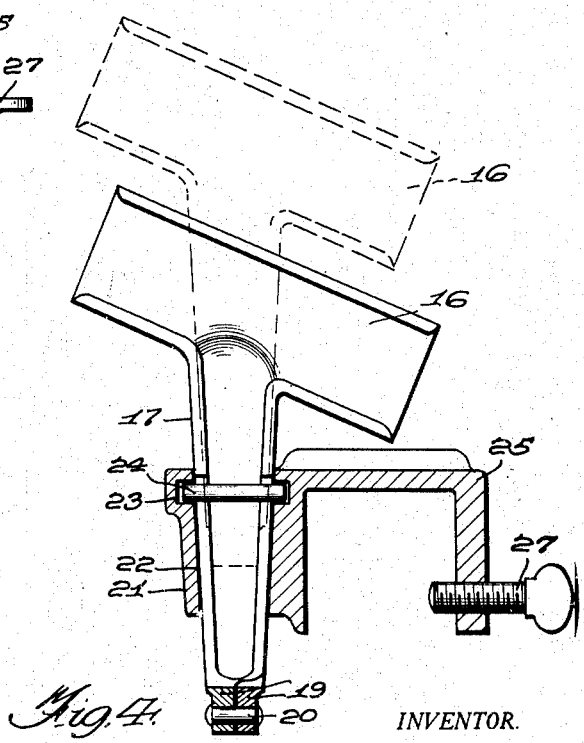
Figure 6:
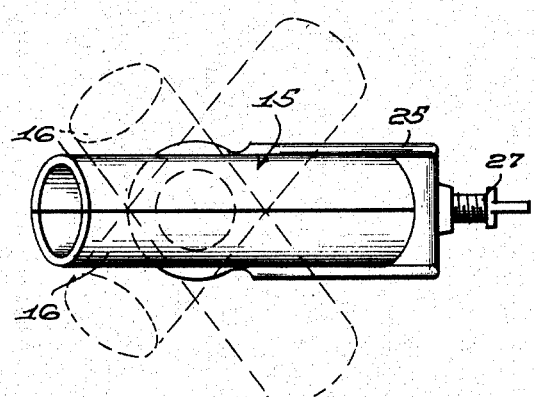
Figure 7:
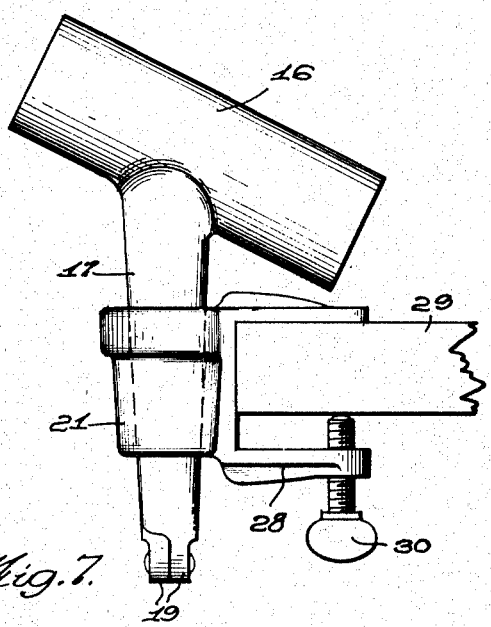
Figure 8:
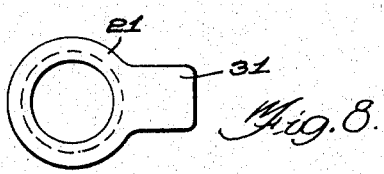
Figure 9:
Figure 10:
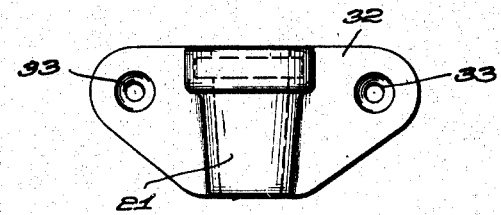
Figure 11:
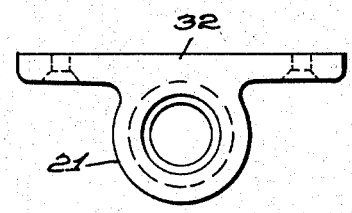

In the accompanying drawings, forming a part of this specification, and in which like numerals are employed to designate like parts throughout the same, Figure 1 is a side elevation of a holding device embodying my invention, Figure 2 is an end elevation of the same, Figure 3 is an end elevation of the jaws of the holding device, the supporting sleeve being shown in central vertical section, Figure 4 is a longitudinal section taken on line 4—4 of Figure 2, Figure 5 is a horizontal section taken on line 5—5 of Figure 1, Figure 6 is a plan view of the device, Figure 7 is a side elevation of a modified form of the device, Figure 8 is a plan view of a modified form of holding sleeve, included in the device, Figure 9 is a side elevation of the same, Figure 10 is a side elevation of a further modified form of the sleeve, and, Figure 11 is a plan view of the same.

In the drawings, wherein for the purpose of illustration, is shown a preferred embodiment of my invention, the numeral 15 designates a holding socket, embodying a pair of substantially semi-cylindrical jaws 16, which when closed, constitute a substantially cylindrical socket, for receiving the fishing rod or pole. The jaws 16 are preferably formed integral with hollow downwardly tapering shanks 17, which are substantially circularly curved in cross section. The inner edges of these shanks have grooves 18, extending longitudinally thereof, and these grooves decrease in depth downwardly. The tapered shanks 17 are provided at their lower ends with knuckles 19, which are hinged together by means of a pin 20.

The numeral 21 designates a sleeve, having a downwardly tapered bore 22. This sleeve is adapted to receive the tapered shanks 17. The sleeve 21 is provided near its upper end with an internal annular groove 23, receiving the ends of a combined expanding and stop element or pin 24. The ends of the pin 24 are loosely mounted in the groove 23, and hence the pin while remaining radial with respect to the groove 23 may be turned within the sleeve 21. The pin 24 is located between the tapered shanks 17 and operates within the grooves 18.

The sleeve 21, Figures 1 to 6, inclusive, is formed integral with an inverted U-shaped clamp 25, adapted to engage over the edge of a boat 26 or like support, such clamp carrying a clamping screw 27.

In Figure 7, the sleeve 21 is formed integral with a horizontally arranged U-shaped clamp 28, to engage over a horizontal portion 29 of the boat, one arm of the clamp carrying a clamping bolt 30.

In Figures 8 and 9, the sleeve 21 is shown integral with the upper end of a post or spear 31, which may be forced into the ground.

In Figures 10 and 11, the sleeve 21 is shown integral with a vertically arranged plate 32, having apertures 33, for receiving screws or the like, whereby the same may be attached to a suitable support.

In connection with the forms of the invention, as shown in Figures 7 and 11, inclusive, all remaining parts of the device remains identical with those described in connection with the first form of the invention.

In use, the sleeve 21 is suitably supported, preferably in a vertical position, and the finishing rod or pole is held within the jaws 16, which are inclined or angularly arranged with relation to the shanks 17. The shanks 17 may be turned upon their longitudinal axes, within the sleeve 21, the pin 24 sliding within the groove 23. The rear end of the pole projects rearwardly beyond the jaws 16, and hence the fisherman may grasp this rear end and suddenly move the pole upwardly. This action elevates the jaw 16, and the pin 24 engaging the walls of the grooves 18, automatically spread the shanks and jaws 16, whereby the pole is released. The knuckles 19 contact with the pin 24, when shifted upwardly and hence the shanks can not be separated from the sleeve 21.

It is to be understood that the forms of my invention, herewith shown and described are to be taken as preferred examples of the same, and that various changes in the shape, size and arrangement of parts may be resorted to without departing from the spirit of my invention, or the scope of the subjoined claims.

Having thus described my invention, I claim:

1. A device for holding a fishing rod or pole, comprising a sleeve, co-acting jaws for receiving the rod or pole and having tapered shanks, operating within the sleeve, and means carried by the sleeve to spread the shanks upon their longitudinal movement with relation to the sleeve.

2. A device for holding a fishing rod or pole, comprising a sleeve, co-acting jaws for receiving a pole or rod and having depending tapered shanks operating within the sleeve, and a spreading element carried by and arranged within the sleeve for engagement between the shanks to spread them when they are moved upwardly.

3. A device for holding a fishing rod or pole, comprising a sleeve, a pin extending transversely through the sleeve, a pair of jaws to receive and hold the rod or pole, and depending tapered shanks carried by the jaws and operating within the sleeve with the pin arranged between the shanks, said shanks having inner inclined faces engaging said pin, the ends of the shanks being pivotally connected.

4. A device for holding a fishing rod or pole, comprising a sleeve, having an internal annular groove, a pin arranged within the sleeve and having its ends slidable within the groove, tapered shanks slidable within the sleeve with the pin arranged between them, means pivotally connecting the ends of the shanks, and jaws carried by the shanks.

In testimony whereof I affix my signature.

GLEN E. GIFT.